United States Patent [19]

Regalbuto

[11] Patent Number: 5,735,440
[45] Date of Patent: Apr. 7, 1998

[54] BICYCLE MOUNTED SQUIRT GUN AND FLUID DISPENSING APPARATUS

[76] Inventor: Michael A. Regalbuto, 3734 Benton St., Santa Clara, Calif. 95051

[21] Appl. No.: 633,065

[22] Filed: Apr. 15, 1996

[51] Int. Cl.⁶ .................................................. A01C 5/64
[52] U.S. Cl. ........................ 222/610; 222/628; 222/400.8
[58] Field of Search ............................... 222/610, 628, 222/175, 394, 400.8, 401; 280/288.4, 304.5

[56] References Cited

U.S. PATENT DOCUMENTS

| | | | |
|---|---|---|---|
| 3,098,587 | 7/1963 | Hopfeld | 222/628 |
| 3,677,446 | 7/1972 | Guyer et al. | 222/610 |
| 4,807,813 | 2/1989 | Coleman . | |
| 4,815,635 | 3/1989 | Porter . | |
| 4,903,864 | 2/1990 | Sirhan . | |
| 4,911,339 | 3/1990 | Cushing . | |
| 5,074,437 | 12/1991 | D'Andrade et al. . | |
| 5,119,978 | 6/1992 | Kalamaras et al. | 222/610 X |
| 5,141,462 | 8/1992 | Latzel . | |
| 5,150,819 | 9/1992 | Johnson et al. . | |
| 5,158,212 | 10/1992 | Sirhan . | |
| 5,158,218 | 10/1992 | Wery . | |
| 5,167,554 | 12/1992 | Tager et al. . | |
| 5,184,755 | 2/1993 | Brovelli . | |
| 5,201,442 | 4/1993 | Bakalian . | |
| 5,215,231 | 6/1993 | Paczonay | 222/610 |
| 5,238,149 | 8/1993 | Johnson et al. . | |
| 5,301,858 | 4/1994 | Hollander . | |
| 5,301,860 | 4/1994 | Paczonay . | |
| 5,326,124 | 7/1994 | Allemang . | |

FOREIGN PATENT DOCUMENTS

61446/90  3/1991  Australia ........................... 222/628

*Primary Examiner*—Gregory L. Huson
*Attorney, Agent, or Firm*—Fenwick & West LLP

[57] ABSTRACT

A fluid dispensing apparatus is mounted to and supported by any of numerous sizes and styles of bicycles. The fluid dispensing apparatus has a means for storing water, a means for pressurizing stored water, a means for controlling the release of pressurized water in the form of a plurality of high velocity water jets, a means for independently aiming said water jets, a means for conducting fluid between components, and a means for mounting components to the frame of a bicycle. One embodiment of the invention incorporates one or a plurality of serially connected pressurized water reservoir assemblies (28), a dual piston-in-cylinder water pump assembly (24), a manually operated water pump lever assembly (22), an assembly (26) of multiple independent, manually-activated triggers, and multiple independently aimable nozzles (160, 190). The reservoir, pump, and trigger assemblies are mounted to and supported by frame members (20a, 20b, 20c, 20d) of the bicycle. The nozzles are mounted to the trigger assembly (26), a point on the frame (20), or to the helmet (192) or body parts of the rider.

20 Claims, 10 Drawing Sheets

→ AIRFLOW

BICYCLE MOUNTED SQUIRT GUN AND FLUID DISPENSING APPARATUS

BACKGROUND OF THE INVENTION

1. Field of the Invention

The invention relates generally to vehicle mounted fluid dispensers, and particularly to pressurized fluid dispensers mounted to a bicycle.

2. Description of the Related Art

Water guns are a popular form of water play. Conventional water guns are differentiated by the types and arrangement of pump mechanisms, water reservoirs, pressure storage vessels, and valving. While recent improvements in water gun technology have increased the range, amount, and duration of water projected, current designs are limited in their total water capacity and in the types of activities that can be accomplished with them. A majority of water guns are hand held, or are otherwise carried by the user. For models with self-contained water reservoirs, the amount of water that can be carried and delivered is limited by the user's ability to hold and support the device. Small models require frequent reloading. Larger models restrict the mobility of the user and are a source of fatigue. Other designs that do not have self-contained water reservoirs limit the user's mobility and the types of available activities due to the need to have an external supply of water available.

U.S. Pat. No. 4,807,813 by Coleman shows a bicycle mounted water toy having an unpressurized fluid reservoir, a rotating impeller pump driven by one of the bicycle's wheels, a control cable for engaging the pump with the wheel, and a helmet-mounted nozzle. The main drawback of this design is that the operation of the pump is dependent on the motion of the bicycle and on the style of tire tread used. In particular, the volume and range of released water is dependent on the speed of the bicycle. The drive mechanism experiences vibration when operating with knobby treads. Additionally, the pump is a source of drag to the forward progress of the bicycle. Furthermore, no valving exists for storing a volume of water under pressure or for precisely triggering the release of the water. And finally, the bicycle must be partially disassembled in order to install the device.

U.S. Pat. No. 5,074,437 by D'Andrete and Johnson, U.S. Pat. No. 5,150,819 by Johnson and D'Andrete, U.S. Pat. No. 5,184,755 by Brovelli, and U.S. Pat. No. 5,238,149 by Johnson and D'Andrete show a succession of modern hand-held water guns. These water guns have a variety of rigid air/water reservoirs that are pressurized by pump action. This type of water gun suffers from several ergonomic disadvantages. Each design involves a pumping action in which one arm works (oftentimes furiously) against the other arm, leading to user fatigue. In order to achieve high pressures, the pumps in these devices deliver small amounts of fluid per stroke. Hence, much pumping is required to develop optimum operating pressure. Merely supporting the weight of such a gun and its supply of water is another source of fatigue. Hence, the gun's overall size and capacity are limited by the size and strength of the intended user. Also, size and weight are hindrances to user mobility.

Furthermore, the range of application of this hand-held style of gun is limited. The nozzle is fixed relative to the supply reservoir. Water is best drawn from the reservoir when the reservoir is upright and horizontal. Hence, the gun tends to shoot air, rather than water, when pointed straight up or down, or when the reservoir is less than full. Requiring two hands to pump and at least one complete hand to shoot, these designs cannot be safely or conveniently operated in combination with a cycling activity.

U.S. Pat. No. 5,141,462 by Latzel (1992) shows a water cannon having an unpressurized water supply reservoir that is strapped to the user's back, connected by a hose to a hand held gun. Such an arrangement allows the gun to shoot a stream of water when aimed in any direction. Otherwise, it suffers all the disadvantages listed above for the hand held models.

Thus, there is a need for a pressurized water dispenser for mounting to and operation with a bicycle, whose components are attached to and supported by the frame members of the bicycle, and which can be safely and efficiently operated while the bicycle is in motion.

SUMMARY OF THE INVENTION

In accordance with the present invention, there is provided a pressurized fluid dispensing apparatus having major components mounted on and supported by a bicycle frame and which make pressurizing, triggering, and aiming of the apparatus safe and efficient for the rider while the bicycle is in motion or at a standstill.

In one embodiment, the apparatus has a manually pressurized pump mounted to the frame to provide support and an opposing force during the manual pressurization of the pump. The pump has a pressurization hose coupled to a fluid reservoir, also preferably mounted to and supported by the bicycle frame. The apparatus also has a nozzle adapted for mounting to the helmet of a user and coupled to the reservoir by a fluid delivery hose. In other embodiments, the nozzle is mounted to the handlebar assembly of the bicycle or to another bicycle component. In yet another embodiment, the apparatus has multiple nozzles for selectively dispensing fluid. The apparatus additionally has a trigger assembly for controlling the dispensing of fluid through the nozzle. In one embodiment having a plurality of nozzles, the trigger assembly has a plurality of trigger releases to independently release fluid through one or more selected nozzles.

Another embodiment has a plurality of serially coupled reservoirs for increased fluid storage capability. In this embodiment, the plurality of reservoirs are coupled by fluid and pressure hoses to maintain substantially equal pressure among the reservoirs and to transfer fluid between reservoirs.

DESCRIPTION OF THE PREFERRED EMBODIMENT

Figure 1:
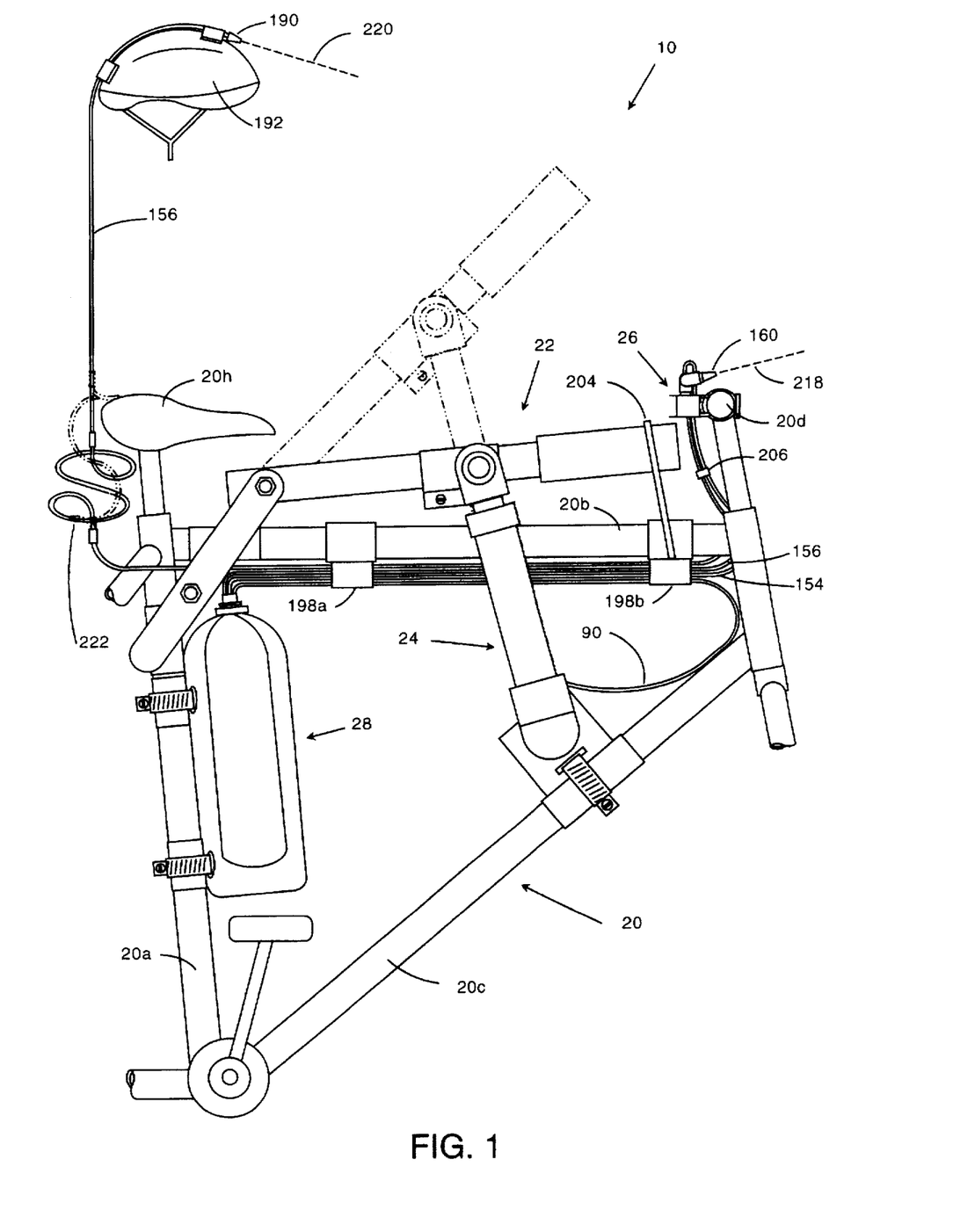
FIG. 1 illustrates a side view of a bicycle mounted water gun in accordance with the present invention.

FIG. 1 illustrates a side view of a bicycle mounted water gun 10 in accordance with the present invention. Water gun 10 (fluid dispensing device) is mounted to one style of bicycle frame 20. The water gun 10 includes four major components: a lever assembly 22, a pump assembly 24, a trigger assembly 26, and a reservoir assembly 28.

Figure 2:
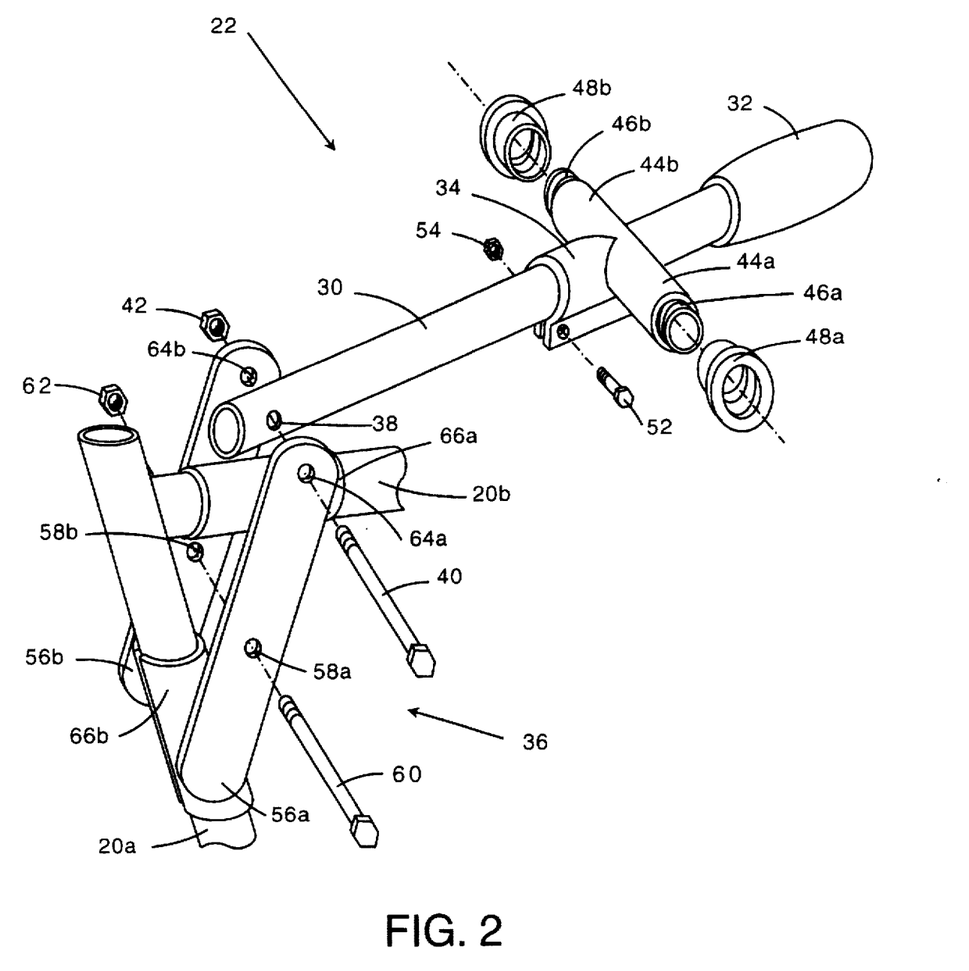
FIG. 2 illustrates an exploded perspective view of a pump lever assembly in accordance with the present invention.

FIG. 2 illustrates an exploded perspective view of lever assembly 22 in accordance with the present invention. Lever assembly 22 includes a lever 30, a handle 32, a pivot bracket 34, a bar clamp 36, and various small hardware items. Lever 30 is an elongated member, having a pivot axis near one end in the form of a hole 38. Lever 30 pivots on a bolt 40. Bolt 40 is kept in place by a nut 42. Handle 32 is fitted over the other end of lever 30.

Pivot bracket 34 is a T-shaped member. The body of bracket 34 is tubular and shaped to form a slideable clamp on lever 30. Bracket 34 is clamped in place with a bolt 52 and nut 54. Arms 44a, 44b of bracket 34 are cylindrical members having long axes perpendicular to lever 30 and preferably horizontal with respect to the ground. The ends of arms 44a, 44b are fitted with externally threaded studs 46a, 46b. Internally threaded retaining knobs 48a, 48b screw onto studs 46a, 46b.

Clamp 36 consists of two preferably identical flattened and elongated bars 56a, 56b. Holes 58a, 58b near the midpoints of bars 56a, 56b accommodate a clamp bolt 60. Bolt 60 is fitted with a nut 62. Holes 64a, 64b near one end of bars 56a, 56b accommodate bolt 40. Liners 66a, 66b are thin flexible tubes, split lengthwise, that clip onto frame members 20a, 20b underneath bars 56a, 56b.

Figure 3:
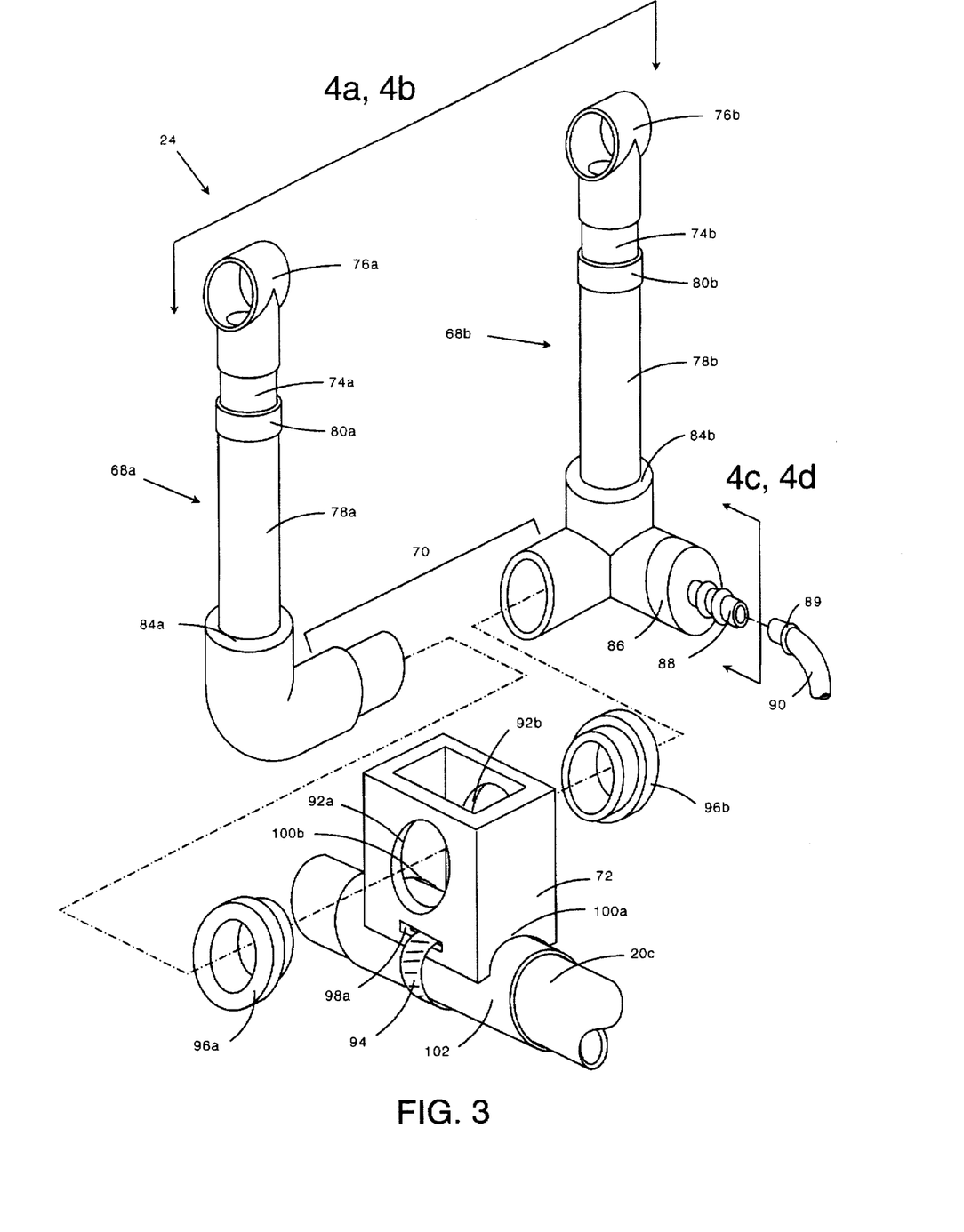
FIG. 3 illustrates an exploded perspective view of a pump assembly in accordance with the present invention.

FIG. 3 illustrates an exploded perspective view of pump assembly 24. FIG. 3 shows the externally visible components of pump assembly 24. Two piston-in-cylinder pump sub-assemblies 68a, 68b are connected in a parallel arrangement by a manifold 70. Manifold 70 passes through and pivots on bushings 96a, 96b, which are fitted into opposite sides of a mounting bracket 72.

Sub-assemblies 68a, 68b each include a piston 74a, 74b, a gudgeon 76a, 76b, a cylinder 78a, 78b, and a cap 80a, 80b. Pistons 74a, 74b and cylinders 78a, 78b are elongated hollow cylindrical members. Pistons 74a, 74b are thick-walled. In one embodiment of the invention, pistons 74a, 74b are made from Schedule 40 PVC tubing, and cylinders 78a, 78b are made from Class 200 PVC tubing. Gudgeons 76a, 76b are each attached to one end of pistons 74a, 74b. The stems of gudgeons 76a, 76b are hollow throughout and provide paths for airflow from the outside atmosphere into pistons 74a, 74b. Caps 80a, 80b are short tubular members each having an internal shoulder at one end. Caps 80a, 80b fit onto cylinders 78a, 78b such that one end of cylinders 78a, 78b butts up against the shoulder of caps 80a, 80b. Pistons 74a, 74b pass through the opening in caps 80a, 80b and telescope within cylinders 78a, 78b.

Manifold 70 is a cylindrical conduit having intake ports 84a, 84b for each cylinder 78a, 78b, and an exhaust port 86. Attached to exhaust port 86 is a hose fitting 88. A flexible exhaust hose 90 connects to fitting 88. A ring clamp 89 passes over hose 90 and fitting 88.

Bracket 72 is a rectangular box structure. Holes 92a, 92b are located on opposing faces and accept bushings 96a, 96b. Slots 98a, and 98b (not shown) are located beneath holes 92a, 92b, and allow a circular clamp 94 to pass through. Rounded notches 100a, 100b located at the ends of the base of bracket 72 accommodate frame member 20c. Bracket 72 is aligned on frame member 20c such that the pivot axis created by bushings 96a, 96b is perpendicular to frame member 20c and parallel to the ground. A liner 102 is a thin flexible tube, split lengthwise, that clips onto member 20c, beneath bracket 72 and clamp 94.

Figure 4A:
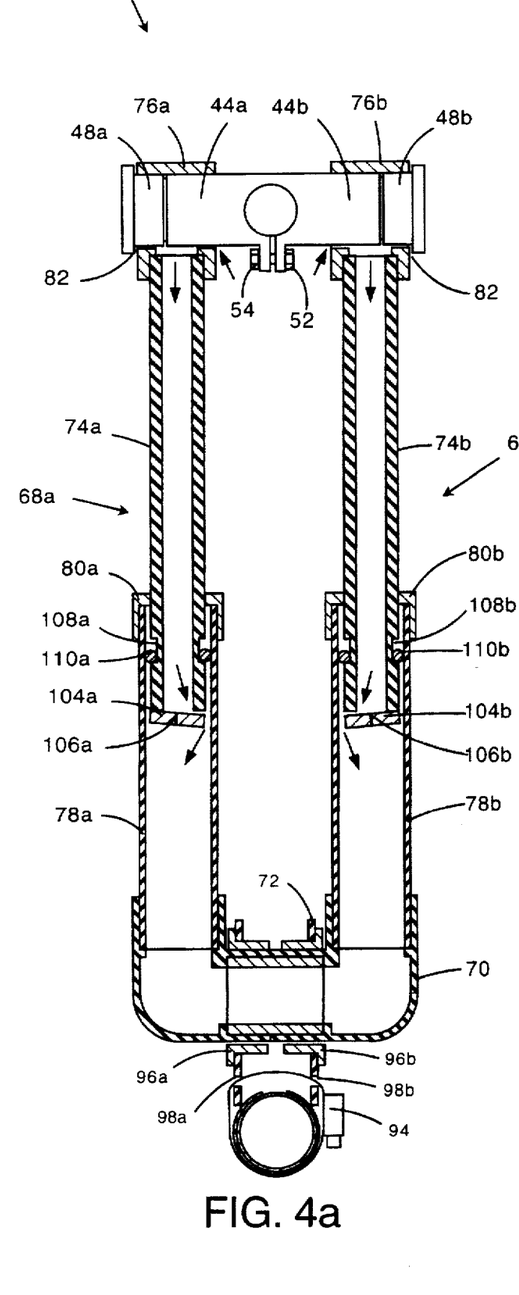
FIGS. 4a–4d illustrate cross sections of a pump assembly in accordance with the present invention.
Figure 4B:
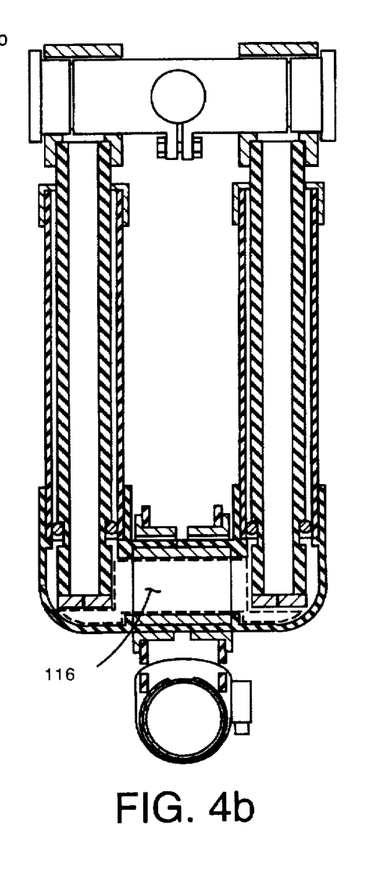
Figure 4C:
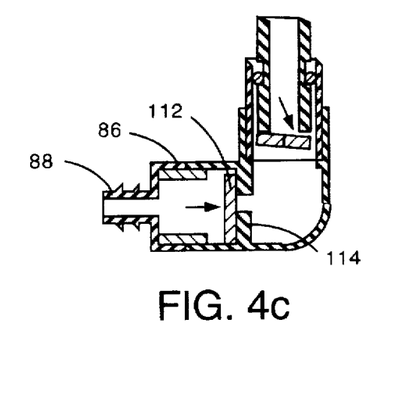
Figure 4D:
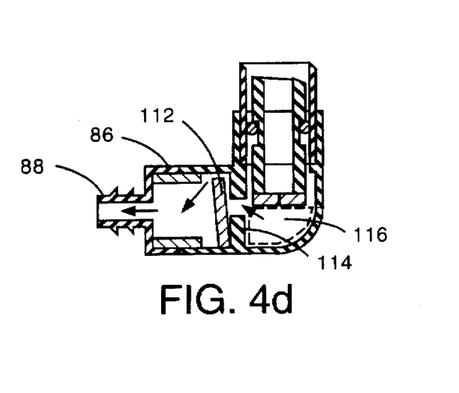

FIGS. 4a–d illustrate cross sections of pump assembly 24 and show the internal components of pump assembly 24. The eye of gudgeon 76a fits over arm 44a and knob 48a, and likewise for gudgeon 76b, arm 44b and knob 48b. The bore of gudgeons 76a, 76b is sized to create air gaps 82. A flapper 104a, 104b is a circular piece of flexible material. A normally closed puncture 106a, 106b is located in the center of each flapper 104a, 104b. Flappers 104a, 104b are seated on the ends of pistons 74a, 74b opposite gudgeons 76a, 76b. A portion of flapper 104a, 104b is not only seated on, but is attached to piston 74a, 74b. Near the flapper end of piston 74a, 74b is a circumferential groove 108a, 108b into which is fitted an O-ring 110a, 110b. Referring now to FIG. 4c, a shoulder 114 creates an airtight seat for a flapper 112 during the intake stroke of the pump. Flapper 112 is partially attached to seat 114, and flexes open during the exhaust stroke of the pump (as illustrated in FIG. 4d). Referring now to FIG. 4b, a pressure adjustment space 116 is the hollow region within manifold 70 that is not swept by pistons 74a, 74b.

Figure 5:
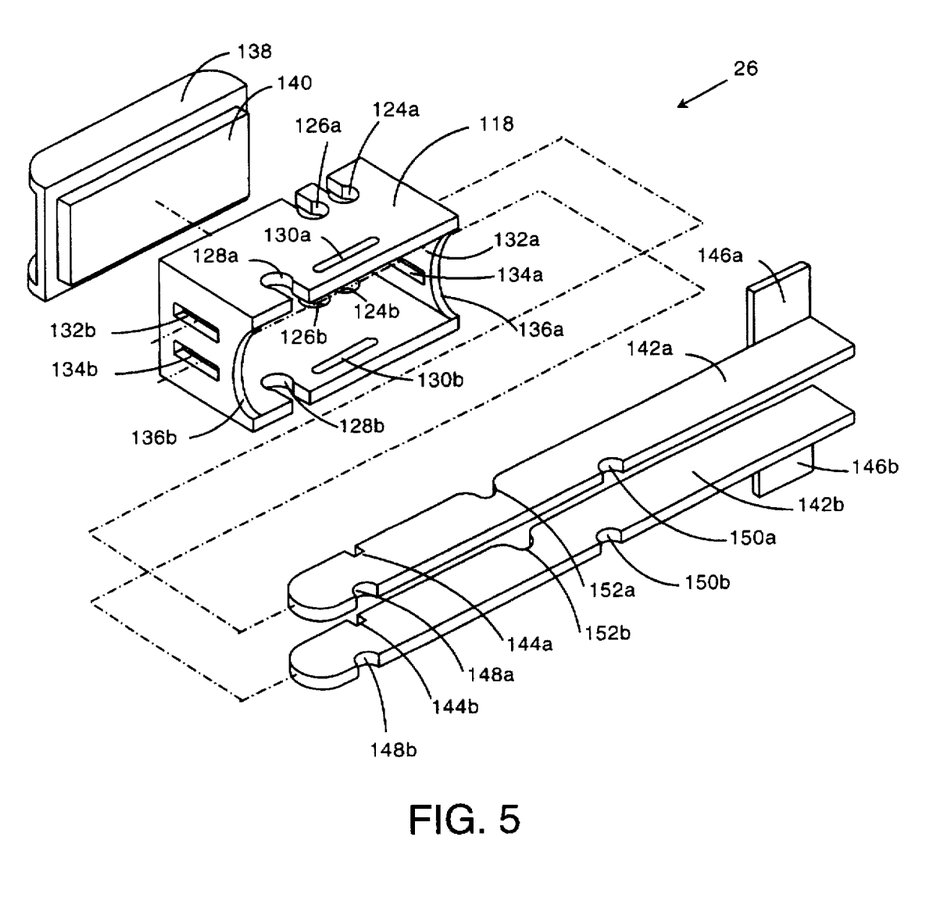
FIG. 5 illustrates an exploded perspective view of a trigger assembly in accordance with the present invention.

FIG. 5 illustrates an exploded perspective view of a trigger assembly 26 in accordance with the present invention. A trigger bracket 118 is an open ended rectangular box structure. On top and bottom surfaces are pairs of hose retention notches 124a, 124b, 126a, 126b, 128a, 128b, and clamp slots 130a, 130b. On side surfaces are pairs of trigger lever guide slots 132a, 132b, 134a, 134b, and rounded handlebar notches 136a, 136b. An assembly composed of a valve pinch plate 140 and a band retaining channel 138 is fitted into the open end of bracket 118. Slots 132a, 132b and 134a, 134b accommodate trigger levers 142a and 142b, respectively. Trigger levers 142a, 142b are elongated bars. In each lever 142a, 142b a pivot notch 144a, 144b is placed on the front edge near one end. Lever 142a is inserted through guide slots 132a, 132b such that pivot notch 144a engages and pivots within guide slot 132b. Likewise for lever 142b and slots 134a, 134b. On the front edges at the opposite end of levers 142a, 142b are finger pads 146a, 146b. Two band retention notches 148a, 150a, and 148b, 150b, are located on the back edges of levers 142a, 142b. A hose clearance notch 152a is located on the front edge of lever 142a, between notch 144a and pad 146a. Likewise for hose clearance notch 152b on lever 142b. In the completed assembly, notch 152a aligns with notches 126a and 126b, and allows a hose 156 (illustrated in FIG. 6a) to pass freely between lever 142a and plate 140. Likewise for notch 152b, notches 124a, 124b, and a hose 154.

Figure 6A:
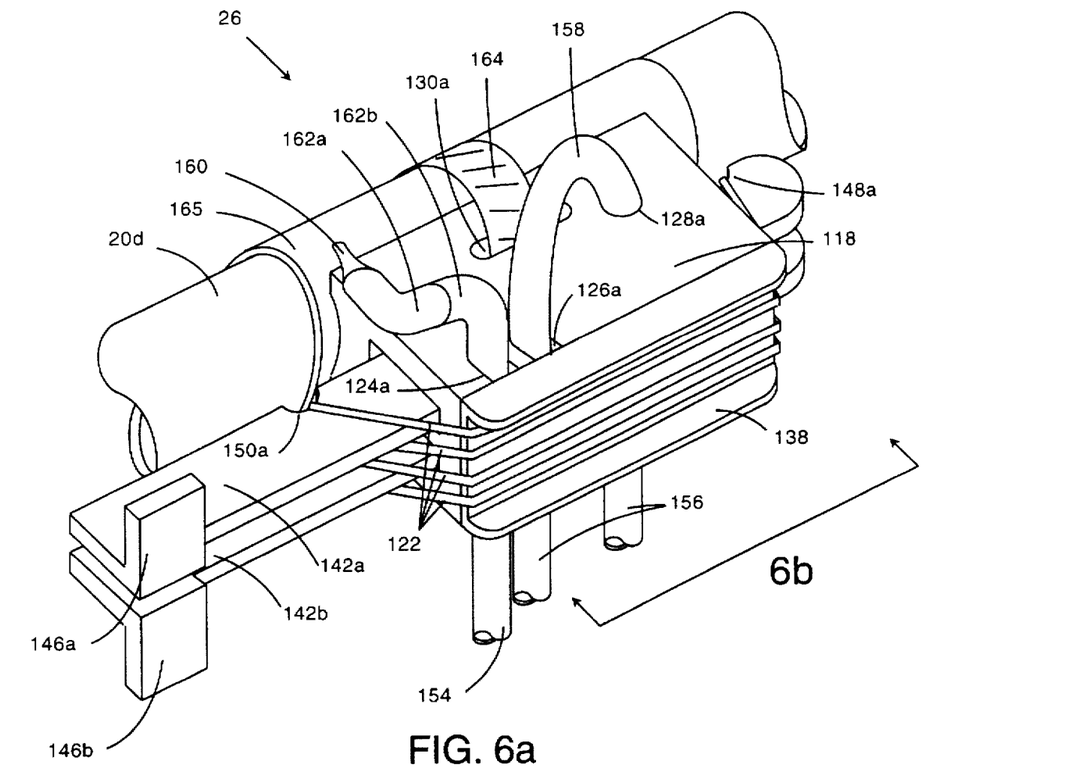
FIG. 6a illustrates a perspective view of a trigger assembly and a frame-mounted nozzle in accordance with the present invention.

FIG. 6a illustrates a perspective view of the trigger assembly 26 in accordance with the present invention. Hose 154 passes through bracket 118, clipping into notches 124a and 124b. Likewise, hose 156 clips into notches 126a and 126b. A length of hose 156 is formed into a stress relief loop 158 as hose 156 is passed back through bracket 118 and is clipped into notches 128a and 128b. A frame nozzle 160 is attached by a series of two swivel fittings 162a, 162b to hose 154 as hose 154 emerges from notch 124a. Elastic bands 122 are looped over notches 148a, 148b in levers 142a, 142b and stretched across channel 138, then looped over notches 150a, 150b. Slots 130a and 130b allow passage of a circular clamp 164 through bracket 118 and around handlebars 20d. A thin, flexible tubular liner 165, split lengthwise, is clipped around handlebars 20d, underneath bracket 118 and clamp 164.

Figure 6B:
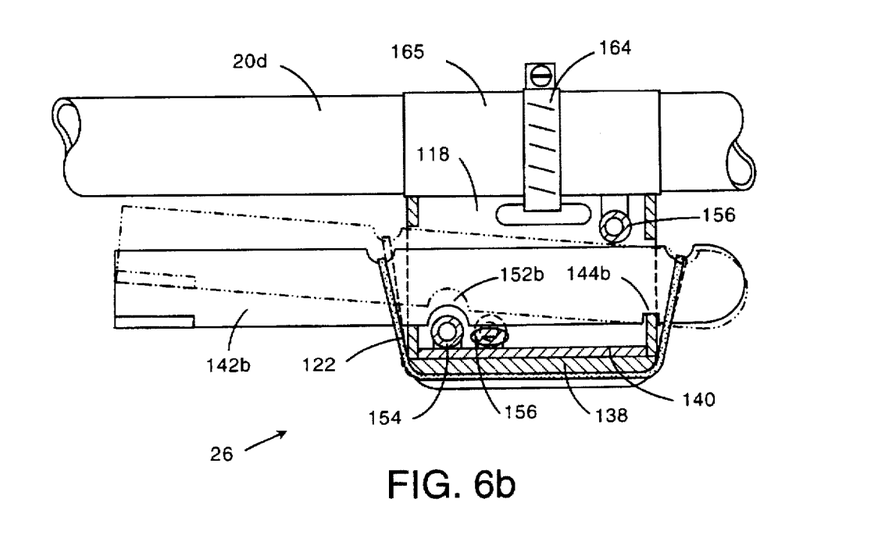
FIG. 6b illustrates a cutaway top view of a trigger assembly in accordance with the present invention.

FIG. 6b illustrates a cutaway top view of trigger assembly 26. In its rest position, lever 142b pinches hose 156 closed against plate 140, under the bias force created by bands 122. In its active position, lever 142b pivots about notch 144b, creating a gap that allows hose 156 to open. Notch 152b in lever 142b allows hose 154 to pass freely through bracket 118 at all times. Similarly, lever 142a (shown in FIG. 5) pinches hose 154 and allows hose 156 to pass freely.

Figure 7:
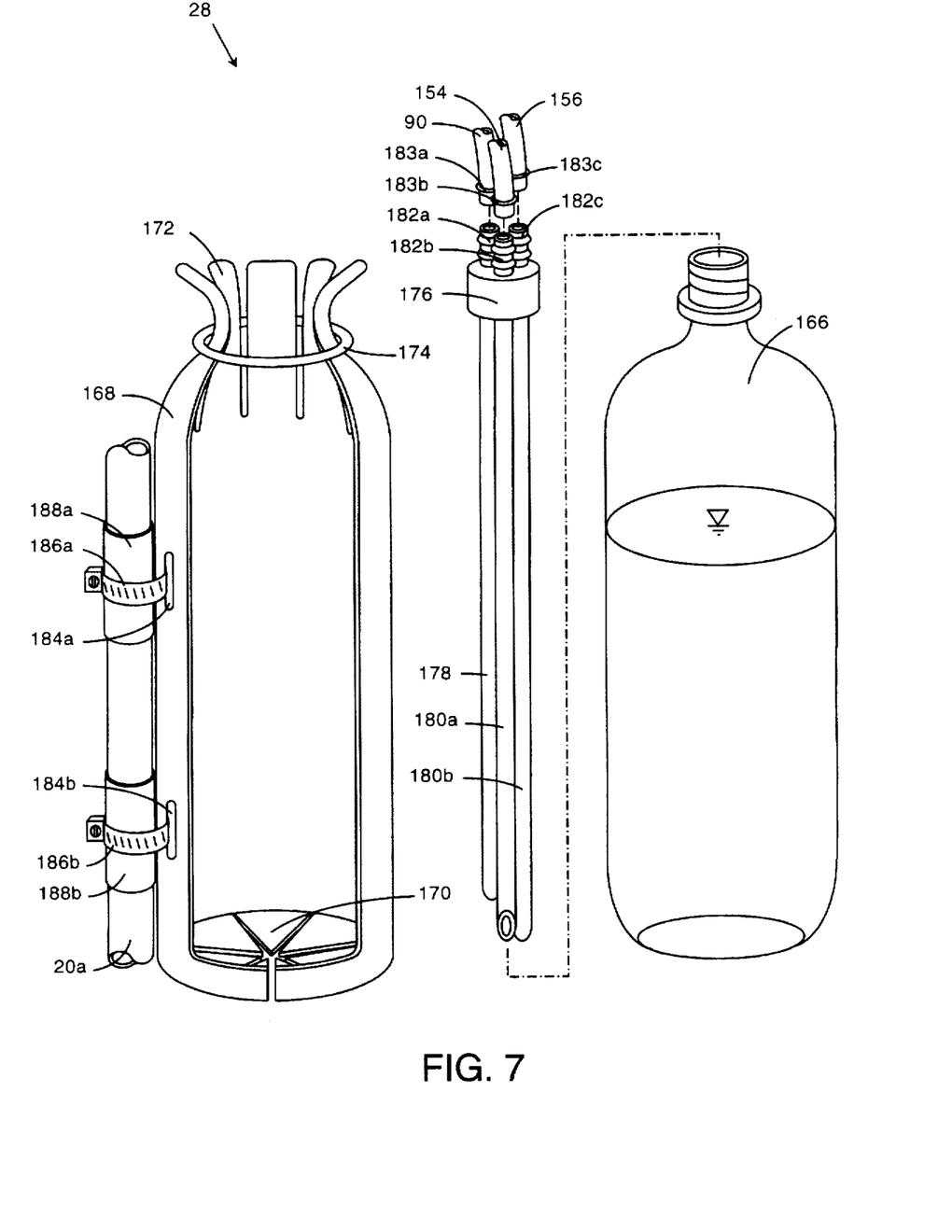
FIG. 7 illustrates a perspective view of a reservoir assembly in accordance with the present invention.

FIG. 7 illustrates a perspective view of reservoir assembly 28 in accordance with the present invention. A reservoir 166 has a cylindrical body, a rounded base on one end, and necks down to an externally threaded orifice at the other end. In one embodiment of the invention, reservoir 166 is formed from a common plastic two liter carbonated beverage container. A reservoir bracket 168 is constructed from a hard, flexible material and is shaped with a cylindrical body, rounded base at one end, and necked region on the other end, to roughly match the shape of reservoir 166. A lengthwise section of bracket 168 is open to allow an avenue to insert and remove reservoir 166. Bracket 168 is sized to provide an interference fit with reservoir 166, and flexes circumferentially to clamp reservoir 166 in place. The base and neck portions of bracket 168 are slotted longitudinally at a number of locations to form base fingers 170 and neck fingers 172. A safety ring 174 is made of a tough, stretchable material. Ring 174 stretches over fingers 172 and is retained in the neck region of bracket 168.

A reservoir cap 176 is threaded internally to match the threads on the orifice on reservoir 166. Cap 176 and reservoir 166 screw together to form an airtight seal. Passing through the top of cap 176 are a compressed air inlet tube 178 and two pressurized water outlet tubes 180a, 180b. Tube 178 is shorter than tubes 180a, 180b. Tubes 178, 180a, 180b pass into reservoir 166 when cap 176 is screwed in place. Each of tubes 178, 180a, 180b terminates outside of cap 176 with a hose fitting 182a, 182b, 182c. Exhaust hose 90 (shown in FIG. 3) is inserted onto fitting 182a of inlet tube 178. Ends of hoses 154, 156 (shown in FIG. 6a) are inserted onto hose fittings 182b, 182c of outlet tubes 180a, 180b. Ring clamps 183a, 183b, 183c preferably pass over hoses 90, 154, 156 and fittings 182a, 182b, 182c.

In two or more locations along the length of the body of bracket 168 are located pairs of parallel clamp slots 184a, 184b. Clamp slots 184a, 184b allow for the passage of circular clamps 186a, 186b through bracket 168 and around a suitable member of frame 20. Thin, flexible tubular liners 188a, 188b, split lengthwise, are clipped around a member of frame 20 beneath clamps 186a, 186b.

Figure 8:
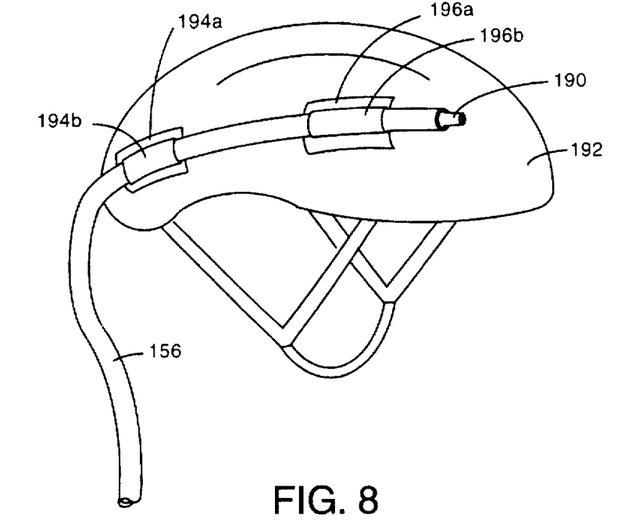
FIG. 8 illustrates a side view of a helmet-mounted nozzle in accordance with the present invention.

FIG. 8 illustrates a side view of a helmet-mounted nozzle 190 in accordance with the present invention. Helmet nozzle 190 is connected to the remaining free end of hose 156. Hose 156 is attached to a rider's helmet 192. Pieces 194a, 196a of one element of a two part fastener material are attached to areas on helmet 192. Pieces 194b, 196b of the mating element of fastener material are attached to corresponding locations on hose 156. A segment of hose 156 between nozzle 190 and trigger assembly 26 is formed into a hose extension coil 222 (shown in FIG. 1).

Figure 9A:
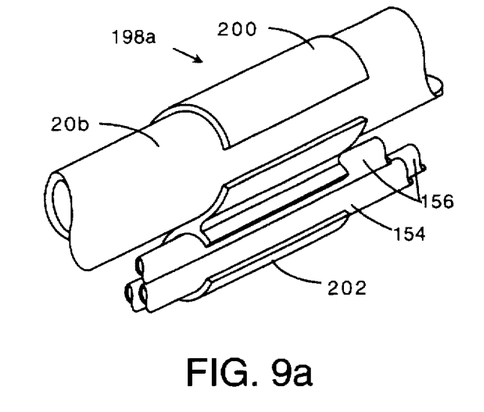
FIGS. 9a–9c illustrate perspective views of hose mounting hardware in accordance with the present invention.

FIG. 9a illustrates a perspective view of a hose-to-frame mounting clip 198a. Clip 198a is a slightly elongated, flexible member having a cross section that is the combination of two vertically stacked "C" shapes. An upper "C" section 200 is clamped on to a suitable member of frame 20. Preferably one or more hoses 90, 154, 156 are held in place by a lower "C" section 202.

Figure 9B:
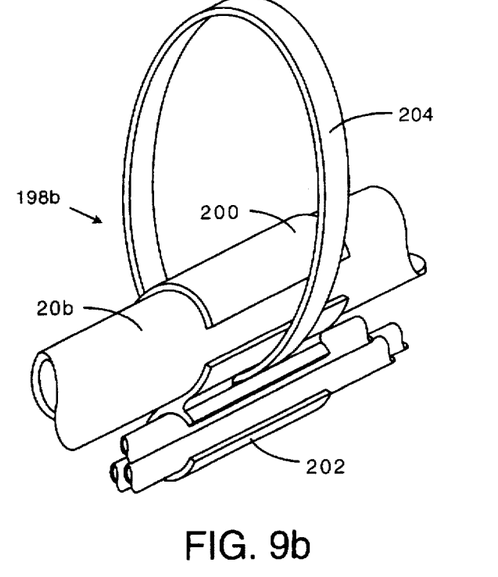

FIG. 9b illustrates a perspective view of hose-to-frame mounting clip 198b combined with a pump lever safety loop 204. Loop 204 passes between "C" sections 200, 202, and around frame member 20b. Loop 204 is composed of a tough, flexible material and is attached to clip 198b so as to remain open and erect. Loop 204 is positioned near the end of handle 32, such that loop 204 can be passed over handle 32 when lever 30 is pivoted to its downward, stowed position.

Figure 9C:
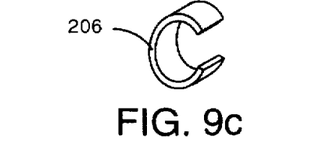

FIG. 9c illustrates a perspective view of a hose-to-hose clip 206, similar to "C" section 202, for holding together two or more hoses 90, 154, 156.

Figure 10A:
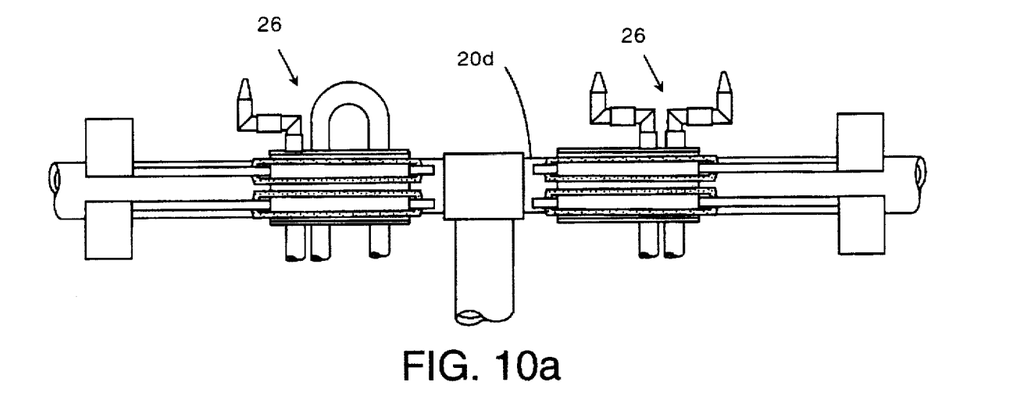
FIGS. 10a–10b illustrate the number and placement of trigger assemblies in accordance with the present invention.
Figure 10B:
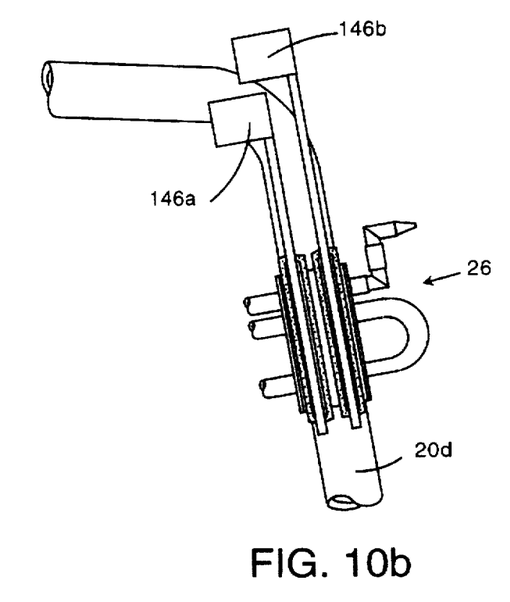

FIGS. 10a and 10b illustrate side views of trigger assemblies 26 and show their preferred placement. Trigger assemblies 26 can be placed near one or both of left and right ends of handlebars 20d (shown in FIG. 10a). Hoses 154, 156 are branched, or new hoses are added, to supply water to additional assemblies 26. Assembly 26 can be attached to straight segments of commonly occurring straight and curved or V-shaped handlebars 20d (shown in FIG. 10b).

Figure 11:
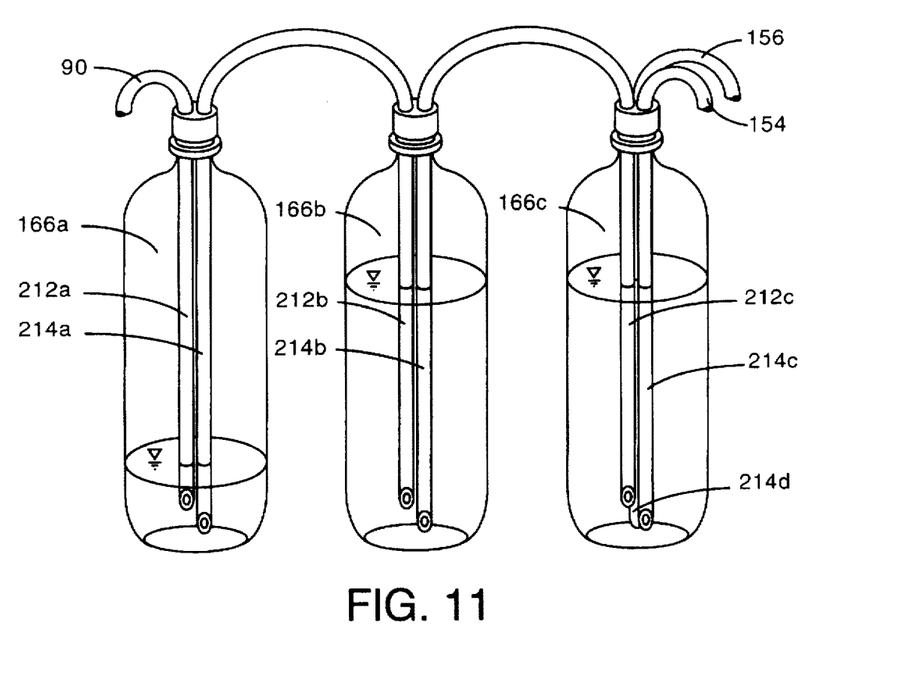
FIG. 11 illustrates a perspective view of serially coupled reservoirs in accordance with the present invention.

FIG. 11 illustrates a perspective view of serially coupled reservoirs 166a, 166b, 166c for increased water storage capacity. A plurality of reservoirs 166a, 166b, 166c can be connected serially and mounted to suitable members of frame 20. Hose 90 carrying compressed air is connected to an input 212a of a first reservoir 166a in the series. An output 214a of reservoir 166a is connected to an input 212b of a second reservoir 166b in the series. Subsequent reservoirs are likewise connected, the output of one being fed into input of the next. The outputs 214c, 214d of a final reservoir 166c in the series are connected to hoses 154, 156, which supply pressurized water to trigger assembly 26.

Figure 12:
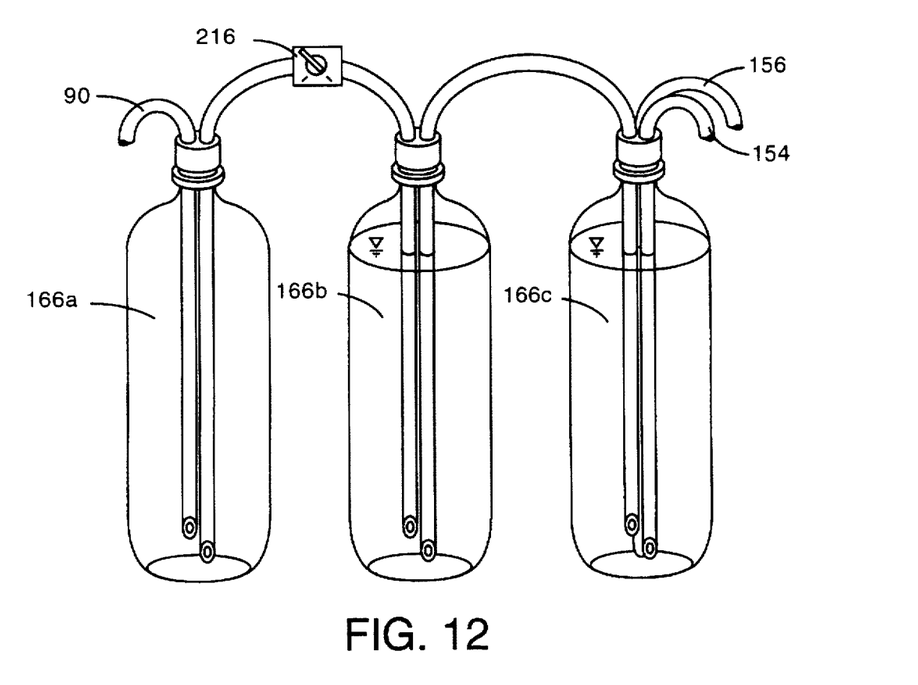
FIG. 12 illustrates a perspective view of a variation on the serially coupled reservoirs in accordance with the present invention.

FIG. 12 illustrates a perspective view of a variation of the serially coupled reservoirs in accordance with the present invention. An open-close valve 216 is interposed in the connection between reservoir 166a and 166b of FIG. 11.

Operation of the Invention

Referring now again to FIG. 1, water gun 10 includes pump assembly 24 for pressurizing air, pump lever assembly 22 for activating pump assembly 26 and reservoir assembly 28 for storing a supply of water. A rider controls the release of a plurality of streams of pressurized water stored in reservoir assembly 28 using trigger assembly 26. The released streams of water are converted into high velocity jets 218, 220 by nozzles 160, 190 mounted to trigger assembly 26 and the rider's helmet 192. Hose 90 conducts compressed air between pump assembly 22 and reservoir assembly 28 and hoses 154, 156 conduct pressurized water between reservoir assembly 28 and trigger assembly 26. Hoses 154, 156 further conduct pressurized water between trigger assembly 26 and nozzles 160, 190. Clips 198a, 198b secure hoses 901, 154, 156 to a member of frame 201. Means for securing hoses to each other is provided by clip 206. Safety loop 204 secures assembly 22 in a stowed position. Hose extension coil 222 allows hose 156 to extend and retract to accommodate changes in the position of the rider's head.

Referring now again to FIG. 2, lever 301 operates as a second class lever. The load of pump assembly 24 (FIG. 3) is carried by bracket 34, which is placed between pivot bolt 40 and the actuating force of the rider at handle 32. Handle 32 provides the rider a cushioned grip for lever 301. Bracket 34 has several functions including:

1) transmitting loads generated during both intake and exhaust strokes of assembly 24 to lever 30;
2) providing bearing surfaces that allow assembly 24 to be assembled onto, and to pivot with respect to, assembly 22;
3) providing a mechanism for adjusting the mechanical advantage of lever 30;
4) providing a mechanism for adjusting the geometry and kinematics of assemblies 22 and 24 to fit different sizes and styles of bicycle frames 20; and
5) increasing the rigidity of lever 30 in the area of load transfer from assembly 24.

Bolt 52 and nut 54 clamp bracket 34 in place on lever 30. Bracket 34 is designed such that assemblies 22 and 24 can be easily assembled to each other. Arms 44a, 44b are preferably sized for a loose fit inside gudgeons 76a, 76b (shown in FIG. 3) so that gudgeons 76a, 76b will easily slip over arms 44a, 44b. Retaining knobs 48a, 48b provide means for locking gudgeons 76a, 76b in place axially on arms 44a, 44b.

Clamp 36 attaches lever 30 to frame 20 and provides a pivot axis for lever 30. Clamp 36 is placed across the elbow formed where vertical member 20a and topmost cross member 20b of frame 20 join at an angle. Bars 56a, 56b are positioned on either side of members 20a, 20b. Nut 62 is tightened onto bolt 60 so as to clamp bars 56a, 56b together. In this arrangement, the pivot axis provided by bolt 40 is constrained to be perpendicular to the plane of frame 20. Hence, the motion of lever 30 is preferably constrained to lie in the plane of frame 20. Also, the pivot axis lies outside of the closed loop formed by members 20a, 20b, and 20c, advantageously giving lever 30 an unrestricted range of motion upward. Liners 66a, 66b protect frame 20 from being scratched by bars 56a, 56b. Depending on the relative diameters of frame members and lever 30, liners are useful as spacers, creating gaps between lever 30 and bars 56a, 56b, allowing lever 30 to pivot without interference from bars 56a, 56b.

Lever 30 is preferably sized and positioned so as to:

1) give sufficient leverage for the rider to activate assembly 24;
2) place handle 32 within easy read of the rider's hands;
3) move in a direction compatible with the rider's arm, shoulder, and torso movements;
4) stow in a safe, non-protruding position near frame 20;
5) not interfere with handlebars 20d; and
6) not interfere with brake, gear, or cables routed along member 20b.

To activate lever 30, the seated rider grasps handle 32 with one hand. On the intake or suction stroke of assembly 24, the rider uses arm, shoulder, and torso action to lift lever 30 in an upward arc, continuing at most until the top of the pump stroke is reached (shown in FIG. 1) or until lever 30 interferes with the bicycle seat 20h. On the exhaust or compression stroke of assembly 24, the rider uses arm, shoulder, and torso action in combination with gravity to push lever 30 in a downward arc, continuing at most until the bottom of the pump stroke is reached. Advantageously, the bicycle and the ground provide reactive forces to the forces generated by the rider during pumping actions.

Referring now again to FIGS. 3, 4a, and 4b, pump assembly 24 is a dual piston-in-cylinder pump. As previously mentioned, gudgeons 76a, 76b function as pivotal connections between assemblies 22 and 24. Gudgeons 76a, 76b are hollow to allow the passage of air into pistons 74a, 74b. Pistons 74a, 74b are thick-walled to resist bending moments during activation, to allow for grooves 108a, 108b to be formed, and to provide a seat for flappers 104a, 104b. Pistons 74a, 74b are hollow to allow the passage of air into manifold 70. Caps 80a, 80b function to guide pistons 74a, 74b, and to retain pistons 74a, 74b within cylinders 78a, 78b when pistons 74a, 74b are at the end of their intake stroke. Manifold 70 has several functions including:

1) supplying a rigid support for sub-assemblies 68a, 68b;
2) providing a fluid connection between sub-assemblies 68a, 68b and exhaust port 86;
3) providing a pressure adjustment space 116;
4) forming a seat for flapper 112; and
5) forming pivot surfaces.

Hose fitting 88 quickly connects and disconnects exhaust hose 90 to exhaust port 86. Ring clamp 89 locks hose 90 in place on fitting 88.

Bracket 72 adjustably mounts assembly 24 to member 20c. Bracket 72 prevents any brake, gearshift, or other cable routed along member 20c from being crimped or otherwise prevented from operating normally. Bracket 72 is positioned circumferentially on member 20c so that the pivot axis provided by bushings 96a, 96b is perpendicular to the plane of frame 20. Clamp 94 secures bracket 72 to member 20c. Clamp 94 preferably wraps around the surface of member 20c, underneath any cabling. Liner 102 protects member 20c from scratching by bracket 72 and by clamp 94.

Referring now again to FIGS. 4a–4d, the pump action of assembly 24 is described. During the intake stroke of assembly 24 (shown in FIGS. 4a, 4c), pistons 74a, 74b are extracted from cylinders 78a, 78b, creating a partial vacuum inside cylinders 78a, 78b and in space 116.

Air within fitting 88 is at atmospheric pressure or greater. The pressure differential between air in space 116 and in fitting 88 creates a force on flapper 112. This force closes flapper 112 against seat 114. As such, flapper 112 holds air in fitting 88 at bay.

Air within the hollow regions in pistons 74a, 74b is at atmospheric pressure. The pressure differential between air in cylinders 78a, 78b and in pistons 74a, 74b creates a force on flappers 104a, 104b. This force causes flappers 104a, 104b to flex open. Air in pistons 74a, 74b rushes past flappers 104a, 104b into cylinders 78a, 78b. Forces generated at bracket 34 during extraction open air gaps 82 between arms 44a, 44b and gudgeons 76a, 76b. Air at atmospheric pressure continues to be drawn into pistons 74a, 74b through air gaps 82 until the intake stroke is complete.

At the completion of the intake stroke, O-rings 110a, 110b contained in grooves 108a, 108b butt against the internal shoulder of caps 80a, 80b. As such, pistons 74a, 74b are prevented from becoming completely extracted from cylinders 78a, 78b.

During the exhaust stroke of assembly 24 (shown in FIGS. 4b, 4d), pistons 74a, 74b are inserted into cylinders 78a, 78b. As insertion proceeds, the pressure inside cylinders 78a, 78b and in space 116 rises above atmospheric. The pressure differential between air in cylinders 78a, 78b and in pistons 74a, 74b creates a force on flappers 104a, 104b. This force closes flappers 104a, 104b against the seats created by the ends of pistons 74a, 74b. As such, flappers 104a, 104b prevent air in cylinders 78a, 78b from escaping back into pistons 74a, 74b.

Pressurized air is prevented from escaping between the inside wall of cylinders 78a, 78b and the outside wall of pistons 74a, 74b by O-rings 110a, 110b. O-rings 110a, 110b seat on the edges of grooves 108a, 108b, and make a sliding seal between pistons 74a, 74b and cylinders 78a, 78b. The seal created by O-rings 110a, 110b is enhanced by coating the inside wall of cylinders 78a, 78b with a suitable lubricant.

Once the pressure within space 116 rises above the pressure in fitting 88, flapper 112 opens, allowing air to escape into fitting 88. Compressed air passes through hose 90 into reservoir 166 (shown in FIG. 7).

During pump activation, pump assembly 24 pivots about gudgeons 76a, 76b at one end, and manifold 70 at the other end. The downward and upward arcing motion of lever 30 is converted to a linear sliding motion of pistons 74a, 74b in and out of cylinders 78a, 78b.

The maximum pressure achievable by a pump designed for compressible fluids is determined by the compression ratio of the pump. The compression ratio is the ratio of the volume inside the pump at the end of the intake stroke, to the volume inside the pump at the end of the exhaust stroke. Pressure adjustment space 116 is sized to set the compression ratio of assembly 24 to a desired value. An unexpected overpressure condition may occur if an incompressible fluid enters the pump. A puncture 106a, 106b within each flapper 104a, 104b acts as a relief valve and prevents overpressure from occurring. This puncture is normally closed, but opens as flappers 104a, 104b are deformed under the influence of rising pressure in manifold 70. Relieved fluid then passes into pistons 74a, 74b and out air gaps 82 into the atmosphere.

The dual piston-in-cylinder design of assembly 24 has several advantages, including:

1) assembly 24 can be attached to frame 20 in such a location that one or more frame members can be interposed between the two sub-assemblies 68a, 68b;
2) the stroke of pistons 74a, 74b and the range of motion of lever 30 are not limited due to interference with frame members;
3) pump output capacity is increased compared to an identically sized single piston-in-cylinder design; and
4) unbalanced bending moments within assemblies 22 and 24, and at mounting points on frame 20 are avoided.

Referring now again to FIGS. 5, 6a, and 6b, assembly 26 incorporates two independently activated pinch valves. These valves are formed by the pinching action of levers 142a, 142b against plate 140 of bracket 118. The valves are normally closed. The rider applies force to fingerpads 146a, 146b to open the valves. Fingerpads 146a, 146b are located on levers 142a, 142b so as to give the rider a mechanical advantage in opening the valves. With hoses 154, 156 open, pressurized water passes up through tubes 180a, 180b in reservoir 166 (shown in FIG. 7), through hoses 154, 156 to nozzles 160, 190 (shown in FIG. 8).

Slots 124a, 124b, 126a, 126b, 128a, 128b allow hoses 154, 156 to be easily assembled into bracket 118. An interference fit of hoses 154, 156 in slots 124a, 124b, 126a, 126b, 128a, 128b functions to hold hoses 154, 156 in place within bracket 118. Bands 122 generate forces that cause levers 142a, 142b to pinch hoses 154, 156 in a normally closed position. Additionally, the band forces cause notches 144a, 144b to remain in contact with pivot points within slots 132b, 134b. Lastly, the band 122 forces clamp channel 138 and plate 140 onto bracket 118. Slots 132a, 132b, 134a, 134b constrain levers 142a, 142b to move in a plane. Additionally, slots 132a, 134a provide stops for the pinching action of levers 142a, 142b, such that levers 142a, 142b can pinch, but not sever, hoses 154, 156. Slots 132b, 134b provide pivot points for levers 142a, 142b.

Trigger assembly 26 is attached to handlebars 20d using an adjustable mechanism that allows the location and orientation of trigger assembly 26 to be adjusted such that levers 142a, 142b are accessible to the rider's fingers while the rider grasps handlebars 20d. Notches 136a, 136b align bracket 118 parallel to a straight segment of handlebars 20d. Clamp 164 functions to secure bracket 118 onto handlebars 20d. Liner 165 functions to protect the handlebars 20d from being scratched by clamp 164 and bracket 118. Liner 165 can also function as a spacer to increase the effective diameter of handlebars 20d.

Referring now again to FIG. 6a, nozzle 160 converts the stream of water released through hose 154 in assembly 26 into high velocity jet 218 (shown in FIG. 1). Swivel fittings 162a, 162b rotate in two perpendicular planes and adjust the azimuth and elevation of nozzle 160. Stress relief loop 158 functions to neatly route hose 156 through assembly 26 and to reduce the chance of hose 156 kinking.

Referring now again to FIG. 7, reservoir assembly 28 attaches and supports reservoir 166 on a member of frame 20. For instance, reservoir assembly 28 is preferably located on member 20a so as to avoid interference with body motions of the rider or with the moving parts of the bicycle. The body of bracket 168 restrains reservoir 166 from moving laterally. Fingers 170 and 172 restrain reservoir 166 from moving axially. With reservoir 166 mounted vertically as shown, fingers 170 also support the weight of reservoir 166. The multiple mounting slots 184a, 184b provided on bracket 168 distribute loading, stabilize, and align bracket 168 along the long axis of member 20a. Clamps 186a, 186b function to secure bracket 168 to member 20a. Liners 188a, 188b protect member 20a from being scratched by clamps 186a, 186b and bracket 168. Safety ring 174 prevents fingers 172 from flexing open from around the necked region of bracket 168. Hence, safety ring 174 functions to lock reservoir 166 in place within bracket 168.

Compressed air enters reservoir 166 through tube 178 and bubbles upward. Compressed air forms a layer in reservoir 166 that pressurizes the underlying layer of stored water. Pressurization can continue until the pressure inside reservoir 166 reaches the maximum output pressure of assembly 24. Tubes 180a, 180b provide means for extracting pressurized water from reservoir 166. The opening of each tube 180a, 180b is placed near the base of reservoir 166 so as to empty reservoir 166 as completely as possible. Tube 178 is shorter than tubes 180a, 180b so as to prevent air from passing from tube 178 directly into tubes 180a, 180b. Hose fittings 182a, 182b, 182c are used to quickly connect and disconnect hoses 90, 154, 156 to tubes 178, 180a, 180b. Ring clamps 183a, 183b, 183c lock hoses 90, 154, 156 in place on fittings 182a, 182b, 182c. By partially unscrewing cap 176 reservoir 166 is rapidly depressurized.

Referring now again to FIG. 8, nozzle 190 and a portion of a hose 156 are safely mounted to a rider's helmet 192 or other apparel worn by the rider. Fastener pieces 194a, 194b, 196a, 196b allow nozzle 190 and hose 156 to be attached and removed quickly with a minimum of effort by the user. This attachment means prevents entanglement of the rider in hose 156, and preferably readily detaches under conditions of undue tension on hose 156, as might occur in a crash or when the rider quickly dismounts the bicycle. Nozzle 190 is preferably aligned with the rider's line of sight. The rider adjusts the azimuth and elevation of nozzle 190 by adjusting (redirecting) his head.

Referring now to FIGS. 1, 9a, 9b, and 9c, hose clips 198a, 198b, and 206 prevent entanglement and kinking of hoses 90, 154, 156, and route hoses 90, 154, 156 neatly and securely along members of frame 20. Hoses 90, 154, 156 are prevented from interfering with the body motions of the rider or with the moving parts of the bicycle. Safety loop 204 locks lever 30 in a non-protruding, downward position. When passed over handle 32, loop 204 prevents lever 30 from pivoting back upward. In this arrangement, member 20b supplies any reaction forces needed to keep lever 30 in place.

Referring now again to FIG. 10a, multiple assemblies 26 mounted on handlebars 20d allow the rider to make use of both hands to trigger jets of water. Water can be squirted in many directions simultaneously. Referring now again to FIG. 10b, bracket 118 allows assembly 26 to be mounted to handles of commonly occurring handlebar shapes while maintaining fingerpads 146a, 146b near the rider's fingers.

Referring now again to FIG. 11, serially linked reservoirs 166a–166c incrementally increase the water storage capacity of the water gun. As assembly 26 is activated, compressed air in reservoir 166a expands, forcing pressurized water up tube 214a and down through tube 212b into reservoir 166b. Pressurized water proceeds similarly through each reservoir in the series until exiting through hoses 154, 156 fitted to the final reservoir 166c. As water continues to be released, compressed air expands to fill each reservoir 166a–c. Although the illustrated embodiment shows three serially coupled reservoirs, a different number of reservoirs may be serially coupled in the same fashion.

Water storage capacity is limited by the load carrying capacity of bicycle, and availability of attachment sites on the bicycle. For the benefit of balance and stability, attachment sites should be as low to the ground as possible.

Referring now again to FIG. 12, the addition of valve 216 includes two purposes:

1) immediately pressurizing serially coupled reservoirs 166b, 166c following a refill; and 2) limiting the loss of compressed air within the water gun prior to refilling reservoirs 166b.

A first reservoir 166a in a series of two or more reservoirs is used to store pressurized air only. In the closed position, valve 216 isolates reservoir 166a from reservoirs 166b, 166c in the series. Compressed air in reservoir 166a has no avenue for release. In this state, reservoirs 166b, 166c can be removed for refilling. Any residual pressure within reservoirs 166b, 166c is lost. This loss of compressed air represents wasted effort by the rider. However, reservoir 166a retains its charge of compressed air. Additionally, reservoir 166a can be further charged. Once refilling is complete and reservoirs 166b, 166c are in place, valve 216 is opened, and reservoirs 166b, 166c are pressurized by the charge in reservoir 166a.

Conclusion, Ramifications, and Scope of Invention

Accordingly, the bicycle mounted fluid dispensing apparatus of the present invention combines the activity of water play with the activity of riding a bicycle with the following advantages:

1) freeing the user from the burden of supporting the weight of water reservoirs;

2) using the bicycle's ability to carry loads, allowing an increased amount of water to be carried relative to self-contained, hand-held designs;

3) using the user's arm and upper body in combination with gravity to activate the pump, with the bicycle frame and the ground supplying reactive forces, and hence allowing a larger pump to be used and, reducing the amount of time to pressurize the system;

4) providing a plurality of independently triggerable and aimable nozzles;

5) providing a variety of mounting locations for the nozzles, including points on the frame of the bicycle and body parts of the user; and 6) incorporating simple means to prevent overpressurization.

Although the above description contains numerous specifications, these should not be construed as limiting the scope of the invention but as merely providing examples of some of the currently preferred embodiments of this invention. For example, an electric pump, a different type of mechanical pump, or a different arrangement of the lever mechanism for the current pump can be used. Additional trigger levers can be added to the trigger assembly. Triggering can be by means of an electric solenoid. The water reservoir can be shaped differently and be mounted to other suitable members of the bicycle frame. Alternative mounting means can be used for each assembly. Nozzles can be mounted at various points on the bicycle frame or on body parts of the rider.

What is claimed is:

1. An apparatus for dispensing fluid from a bicycle having a handlebar assembly and a frame, comprising:

a pump having a manual actuator, a first frame mounting bracket for mounting the pump to the frame and a pump exhaust port;

a reservoir having a second frame mounting bracket, coupled to the pump exhaust port, for holding fluid under pressure;

an actuatable trigger assembly for mounting to the bicycle and coupled to the reservoir for releasing fluid under pressure;

a mountable nozzle coupled to the reservoir by a fluid delivery hose, the nozzle for dispensing fluid responsive to the actuation of the trigger assembly; and a lever with a first end having a pivotable mounting bracket for pivotably mounting the first lever end to the frame and a second end attached to the pump actuator, for manually actuating the pump as the lever is pivoted about the first lever end.

2. The apparatus of claim 1 wherein the second lever end is slideably mounted to the pump actuator adjusting the mechanical advantage of the lever.

3. The apparatus of claim 1 wherein the pivotable mounting bracket is adapted for positioning the first pivotable end of the lever above the frame such that the frame does not restrict lever pivoting.

4. The apparatus of claim 1 wherein the mountable nozzle is adapted for mounting to a helmet.

5. The apparatus of claim 1 wherein the mountable nozzle is adapted for mounting to the handlebar assembly.

6. The apparatus of claim 1 further comprising a second reservoir placed in series with the first reservoir and having a fluid inlet tube coupling the first and second reservoirs, the fluid inlet tube for transferring fluid from the first reservoir to the second reservoir and for maintaining the first and second reservoirs at substantially equal pressure, and having a fluid outlet tube coupling the second reservoir to the trigger assembly for transferring fluid out of the second reservoir.

7. The apparatus of claim 1 further comprising:

a second mountable nozzle coupled to the reservoir by a fluid delivery hose, the second mountable nozzle for dispensing fluid; and a second actuatable trigger assembly for mounting to the bicycle and coupled to the reservoir for releasing fluid under pressure through the second mountable nozzle.

8. The apparatus of claim 1 further comprising a pressure relief valve mounted to the pump.

9. The apparatus of claim 1 wherein the reservoir is formed from a plastic carbonated beverage container.

10. An apparatus for dispensing fluid from a bicycle having a handlebar assembly and a frame, comprising:

a pump having a manual actuator, a first frame mounting bracket for mounting the pump to the frame and a pump exhaust port;

a reservoir having a second frame mounting bracket, coupled to the pump exhaust port, for holding fluid under pressure;

an actuatable trigger assembly for mounting to the bicycle and coupled to the reservoir for releasing fluid under pressure;

a mountable nozzle coupled to the reservoir by a fluid delivery hose, the nozzle for dispensing fluid responsive to the actuation of the trigger assembly; and wherein the pump comprises first and second substantially parallel pump cylinders coupled to the first frame mounting bracket and first and second pump pistons slideably attached to the pump cylinders.

11. The apparatus of claim 10 further comprising a manifold coupling the first and second pump cylinders and having a chamber with an adjustable volume for adjusting the pump compression ratio.

12. The apparatus of claim 10 wherein the first and second pump cylinders are formed from PVC tubing and the pump pistons are formed from PVC tubing.

13. An apparatus for dispensing fluid from a bicycle having a handlebar assembly and a frame, comprising:

a fluid reservoir supported by the frame for holding fluid under pressure;

a manual pump supported by the frame coupled to the fluid reservoir for pressurizing the fluid reservoir;

a trigger assembly mounted to the bicycle and coupled to the fluid reservoir for releasing fluid under pressure;

a fluid dispensing nozzle coupled to the fluid reservoir for dispensing fluid responsive to the actuation of the trigger assembly; and a lever with a first end pivotably mounted to the frame and a second end coupled to the pump, for manually actuating the pump as the lever is pivoted about the first lever end.

14. The apparatus of claim 13 wherein the second lever end is slidably mounted to the pump actuator adjusting the mechanical advantage of the lever.

15. The apparatus of claim 13 wherein the fluid dispensing nozzle is adapted for mounting to a helmet.

16. The apparatus of claim 13 wherein the fluid dispensing nozzle is adapted for mounting to the handlebar assembly.

17. The apparatus of claim 13 further comprising a second reservoir placed in series with the first reservoir and having a fluid inlet tube coupling the first and second reservoirs, the fluid inlet tube for transferring fluid from the first reservoir to the second reservoir and for maintaining the first and second reservoirs at substantially equal pressure, and having a fluid outlet tube coupling the second reservoir to the trigger assembly for transferring fluid out of the second reservoir.

18. The apparatus of claim 13 further comprising:

a second fluid dispensing nozzle coupled to the reservoir by a fluid delivery hose, the second fluid dispensing nozzle for dispensing fluid; and a second trigger assembly for mounting to the bicycle and coupled to the fluid reservoir for releasing fluid under pressure through the second fluid dispensing nozzle.

19. The apparatus of claim 13 further comprising a pressure relief valve mounted to the manual pump.

20. The apparatus of claim 13 wherein the fluid reservoir is formed from a plastic carbonated beverage container.

* * * * *